United States Patent
Braun et al.

(10) Patent No.: US 8,396,363 B1
(45) Date of Patent: Mar. 12, 2013

(54) TONE HOPPED LOCK-IN SYSTEM

(75) Inventors: Michael G. Braun, Ft. Wayne, IN (US); Jeremy Todd Dobler, Ft. Wayne, IN (US); Wayne Henry Erxleben, Ft. Wayne, IN (US); Douglas Paul McGregor, Ft. Wayne, IN (US)

(73) Assignee: Exelis, Inc., McLean, VA (US)

( * ) Notice: Subject to any disclaimer, the term of this patent is extended or adjusted under 35 U.S.C. 154(b) by 763 days.

(21) Appl. No.: 12/558,980

(22) Filed: Sep. 14, 2009

(51) Int. Cl.
*H04B 10/08* (2006.01)
*H04B 10/00* (2006.01)

(52) U.S. Cl. .................. 398/32; 25/32; 25/140; 25/163; 25/182; 25/187

(58) Field of Classification Search .................... 398/32, 398/187
See application file for complete search history.

(56) References Cited

U.S. PATENT DOCUMENTS

| | | |
|---|---|---|
| 6,949,734 B2 | 9/2005 | Neff et al. |
| 2003/0067651 A1* | 4/2003 | Wan et al. ...................... 359/133 |
| 2008/0269616 A1* | 10/2008 | Bloom et al. ................. 600/475 |

* cited by examiner

*Primary Examiner* — Kenneth N Vanderpuye
*Assistant Examiner* — Daniel Dobson
(74) *Attorney, Agent, or Firm* — RatnerPrestia

(57) ABSTRACT

A lock-in ratio measurement system including a plurality of channels. Each of the channels generates and transmits a radiation signal modulated by a sequence of tones. The sequence of tones for each channel being unique in time to that respective channel. Each respective modulated signal is absorbed/reflected from a target or medium and received. Each channel computes a lock-in value based on the received modulation signal. The lock-in values are used to compute ratios between the channels for characterizing a target or medium.

10 Claims, 6 Drawing Sheets

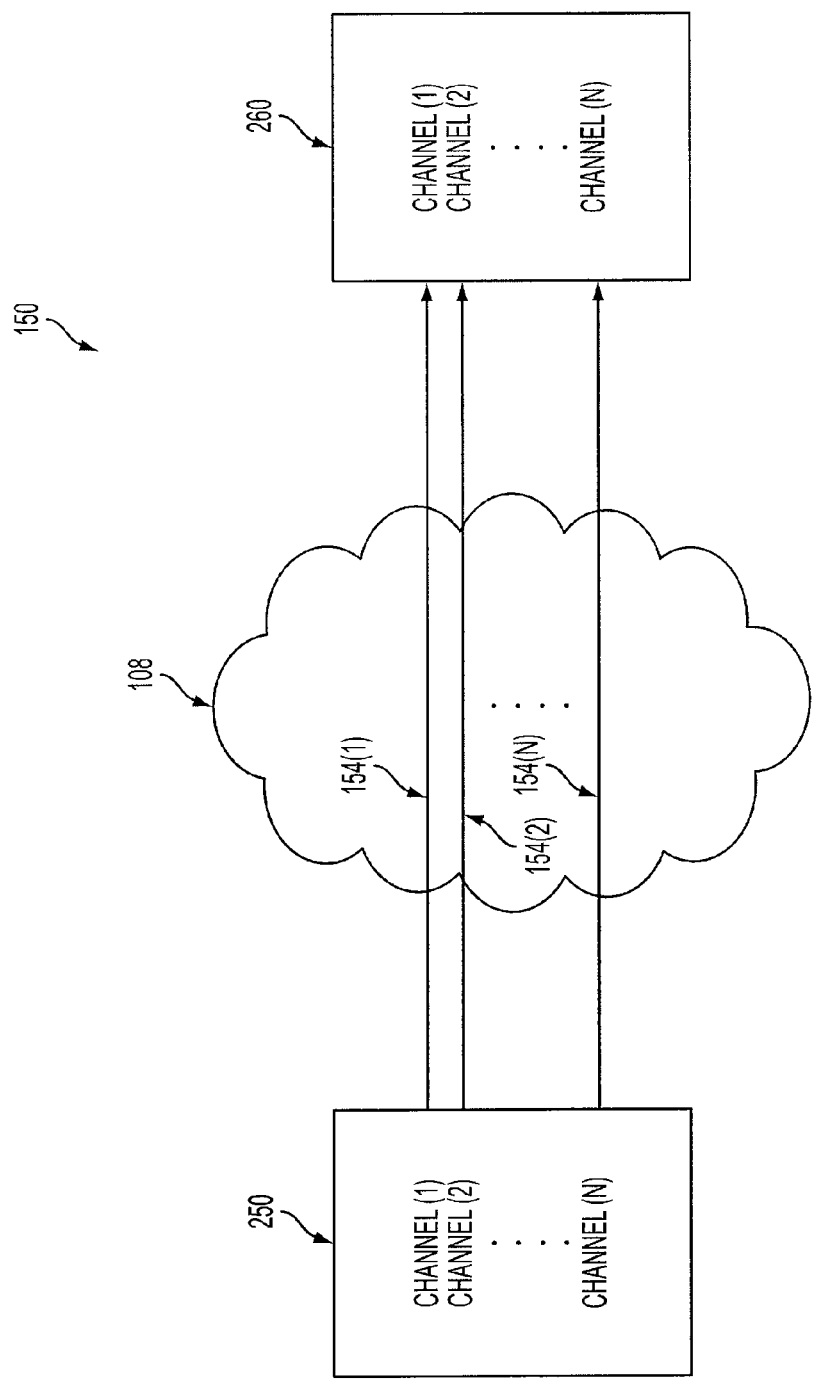

TONE HOPPED LOCK-IN SYSTEM

FIELD OF THE INVENTION

This invention relates, generally, to a lock-in system for differential spectroscopy. The lock-in system includes multiple channels where the modulation of each channel performs synchronous tone hopping in which a light source is modulated by a sequence of multiple tones. Lock-in amplitude measurement for each channel is performed over a time period encompassing a sequence of multiple tones.

BACKGROUND OF THE INVENTION

One measurement channel may transmit modulated radiation (electromagnetic or light) through a medium which may be received after being reflected by a target. Lock-in is then performed on the returned signal. When multiple paths occur (multipath), modulation amplitude variations may result. These variations are due to other reflections of the same channel modulated radiation signal summing in various phases with each other. In these multipath environments, the amplitude variations in the received modulated signal are no longer representative of absorption by the target or medium, thereby resulting in measurement errors.

SUMMARY OF THE INVENTION

To meet this and other needs, and in view of its purposes, the present invention provides a measurement system including a plurality of channels. Each of the channels transmits a unique wavelength signal. The system includes a tone generator for generating a plurality of tones, each tone having a unique frequency, and a unique sequence of the tones for each respective channel. Also included is a modulator for modulating the unique wavelength signal of each channel with the unique sequence of the tones provided for each respective channel.

The measurement system may also include a first unique wavelength signal in a first channel modulated with a first unique sequence of the tones and a second unique wavelength signal in a second channel modulated with a second unique sequence of the tones. At any fixed time during transmission of the first and second modulated signals, the tone in the first channel has a frequency different from the frequency of the tone in the second channel. The first and second unique sequences of the tones may include a same predetermined number of cycles per tone that are generated during a predetermined time period. The frequency of each of the tones in the system is chosen to provide frequency separation between the channels. In general, an $N^{th}$ modulated signal in an $N^{th}$ channel includes an $N^{th}$ sequence of the tones and the $N^{th}$ sequence of the tones in the $N^{th}$ channel is different from any other sequence of the tones in any other channel. Also, the number of transmission channels is equal to or greater than the number of the tones. Upon reception, a lock-in amplifier performs lock-in on the detected signal during a lock-in time period. The lock-in time period includes at least one repetition of the unique sequence of the tones m for each respective channel.

The measurement system may also include a transmitter for transmitting the modulated signals for each channel and a detector for detecting the modulated signals for each channel. A receiver may include an inphase multiplier and quadrature multiplier, and a 90 degree phase shifter for phase shifting the unique is sequence of the tones. The inphase multiplier and quadrature multiplier multiply the detected signal with both the unique sequence of the tones and the 90 degree phase shifted unique sequence of the tones respectively to produce inphase and quadrature components. Also included is an inphase filter and quadrature filter for filtering the inphase and quadrature components, and a lock-in calculator that calculates a lock-in value based on samples of the filtered inphase and quadrature components. Furthermore, the system may also include a ratio calculator that calculates ratios between the lock-in values of the respective channels. The ratios are compared to benchmark values to identify a medium through which the modulated signals are transmitted.

In another embodiment, the system provides an optical signal having a unique wavelength to each of a plurality of channels, generates a plurality of tones, each tone having a unique frequency, modulates the optical signal of each channel with a unique sequence of the tones, and transmits the modulated optical signal of each channel.

The system may also transmit a first optical signal having a first wavelength in a first channel after being modulated with a first sequence of the tones, and transmit a second optical signal having a second wavelength in a second channel after being modulated with a second sequence of the tones. At any fixed time during transmission of the first and second modulated optical signals, the tone in the first channel has a frequency that is different from the frequency of the tone in the second channel.

The system may also detect the modulated optical signal after being transmitted through a medium and reflected by a target. The system then calculates a lock-in value of the detected signal during a lock-in time period. The lock-in time period includes at least one repetition of the unique sequence of the tones for the channel. The system may also calculate ratios of lock-in values, the ratios identifying the medium based on an amount of optical radiation absorbed by the medium and/or target.

In yet another embodiment, the system provides an optical signal having a unique wavelength to each of a plurality of channels, generates a plurality of tones unique frequency tones, modulates the optical signal of each channel with a unique sequence of the tones, and transmits the modulated optical signal of each channel toward a receiver.

The system may then transmit at least a first optical signal having a first wavelength in a first channel after being modulated with a first sequence of the tones, and also transmit at least a second optical signal having a second wavelength in a second channel after being modulated with a second sequence of the tones. The zo first wavelength being absorbed by the medium and the second wavelength not absorbed by the medium.

The system may then receive the modulated optical signal of the first and second channel, and demodulate the modulated optical signal of the first and second channel. Demodulation may be performed by multiplying the first modulated optical signal and the second modulated optical signal by the first sequence of the tones and the second sequence of the tones respectively. Furthermore, lock-in values may be calculated in a time period including at least one repetition of the sequence of the tones.

It is understood that the foregoing general description and the following detailed description are exemplary, but are not restrictive, of the invention.

BRIEF DESCRIPTION OF THE DRAWINGS

FIG. 1b is a block diagram of a one-way tone hopped lock-in system for N channels, according to an embodiment of the present invention.

DETAILED DESCRIPTION OF THE INVENTION

As will be described, the present invention provides a tone hopped lock-in system for balancing modulation frequency dependence among a plurality of channels. The present invention includes multiple (at least two) channels, each channel transmitting and receiving an amplitude modulated radiation signal. In general, the radiation is modulated by a sequence of multiple tones, where the number of tones is greater than or equal to the number of channels in the system.

For example, if there are two channels (channel(1) and channel(2)), then optical signals OS1 and OS2 having fixed wavelengths λ1 and λ2 respectively may each be modulated by tones A and B having frequencies F1 and F2 respectively. In one example, channel(1) may modulate OS1 by tone A during time period T1 and tone B during time period T2. In the same example, channel(2) may modulate OS2 by tone B during time period T1 and tone A during time period T2. Therefore, at any given time, the frequency of the modulating tones of channel(1) and channel(2) are unique to each other so that the channels may be separated upon reception.

The modulated optical signals are received by each channel respectively after being partially absorbed by a medium or a target. Each channel then locks onto the optical signal during a lock-in time period T3 (T3 includes at least the periods of T1 and T2 described above). The lock-in period T3, in this example, includes one repetition of the sequence of tones (e.g. T3 includes one repetition {A, B}). It should be noted, however, that the lock-in period T3 may include multiple repetitions of the two tone sequence (e.g. T3 may include two repetitions {A, B, A, B}, may include three repetitions {A, B, A, B, A, B}, . . . etc). If the travel distance to the medium or target is long (causing a return signal delay), the reference tone sequence used for lock-in is delayed accordingly.

Still assuming two channels, lock-in for each channel results in lock-in values of CH1 and CH2 respectively. Ratios of the lock-in values are then computed between CH1 and CH2 to measure the amount of radiation absorbed by the medium or target. This configuration allows each channel to compute a lock-in value based on the absorption of each respective fixed wavelength optical signal. The alternating amplitude modulation applied to each respective optical signal balances the frequency path dependence of each channel.

Figure 1A:
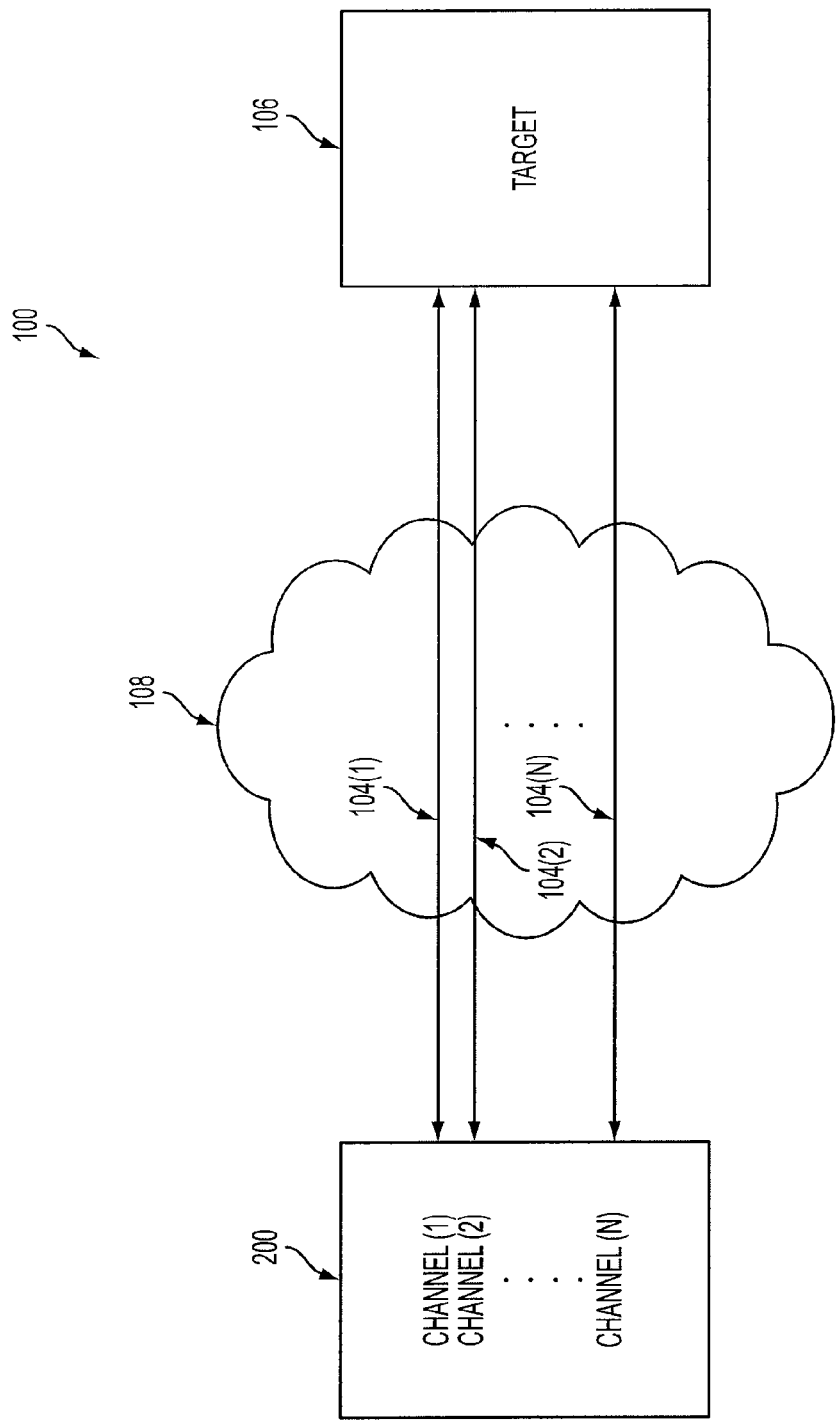
FIG. 1a is a block diagram of a two-way tone hopped lock-in system for N channels, according to an embodiment of the present invention.

In one embodiment, FIG. 1a shows two-way lock-in system 100 including a plurality of channels 200 which are transmitting and receiving radiation signals 104(1)-104(N) respectively. System 100 includes target 106 for reflecting the radiation signals. Target 106 may be a single target at a single distance from channel 200 or may be multiple targets at multiple distances from channel 200. It is understood that the radiation signals may be any type of electromagnetic radiation such as RF radiation or light radiation (e.g. laser). It is also understood that medium 108 or target 106 may be any type of matter such as gases, liquids or solids.

In general, the number of channels for tone hopped lock-in is at least two and may be as many as N. The number of modulation tones in the sequence for each channel is equivalent to (or greater than) the number of channels in the system. For example, if there are N channels, each channel modulates the radiation signal by N tones at N unique frequencies. The tone sequence is broken down into N periods (T1-TN). Each of the N tones is generated in a respective one of the N periods within the sequence.

Each of the N tones is generated in a sequenced manner unique to each channel. Therefore, each channel is amplitude modulating a radiation signal by a unique tone frequency at any given time. For example, channel(1) may modulate a first radiation signal by N tones having frequencies (F1@T1, F2@T2, . . . , FN @TN), channel(2) may modulate a second radiation signal by N tones having frequencies (F2@T1, F3@T2, . . . , F1@TN) and channel(N) may modulate a third radiation signal by N tones having frequencies (FN@T1, F1@T2, . . . , FN−1@TN). The above sequences are one example of synchronized tone sequences having unique frequencies. It is contemplated that other tone sequences could be utilized.

In the two-way tone hopped system, channel(1)-channel (N) transmit radiation signals 104(1)-104(N) through medium 108 toward target 106. The target or medium may be wavelength dependent, thereby absorbing certain wavelengths more than others. Therefore, each channel may generate an online (wavelength that is absorbable by the target or medium) fixed wavelength radiation signal, or a n offline (wavelength that is non-absorbable by the target or medium) fixed wavelength radiation signal. In general, each channel may generate a fixed wavelength radiation signal unique to that specific channel. Radiation signals 104(1)-104(N) are then reflected back to channels 200 where lock-in values (e.g. CH1, CH2 and CH3 for a three channel system) may be computed by each channel respectively. Ratios of the lock-in values for each channel (e.g. CH1/CH3, CH2/CH3 and CH1/CH2 for a three channel system) may be computed to determine the amount of radiation absorbed by the target or medium at each of the fixed wavelengths. These ratios may then be utilized to identify the target or medium.

Figure 2A:
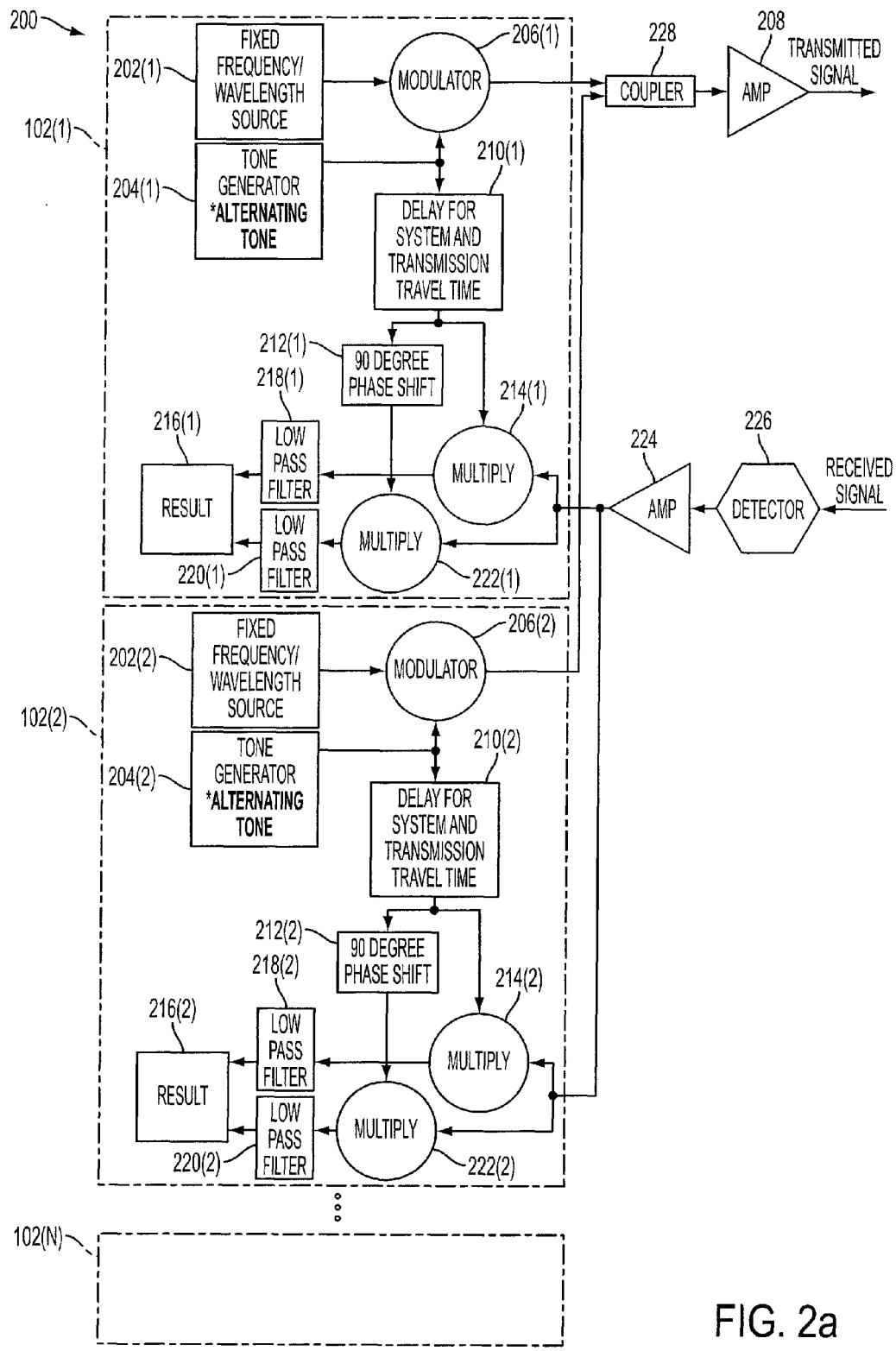
FIG. 2a is a block diagram of a transmitter/receiver for the N channels of the two-way tone hopped lock-in system in FIG. 1a, according to an embodiment of the present invention.

Shown in FIG. 2a is an embodiment of the tone hopped lock-in circuit 200 including channels 102(1)-102(N) that may be used for each of the N channels depicted in the two-way system of FIG. 1a. The transmitter portions of circuit 200 include wavelength source generators 202(1)-202(N), tone generators 204(1)-204(N), modulators 206(1)-206(N), coupler 228 and amplifier 208. The receiver portions of circuit 200 include detector 226, amplifier 224, multipliers 214(1)-214(N) and 222(1)-222(N), low pass filters 218(1)-218(N) and 220(1)-220(N), and lock-in value calculators 216(1)-216(N). Furthermore, the transmitter portions and receiver portions of circuit 200 are coupled together by synchronization portions including optional delay modules 210(1)-210(N) and 90 degree phase shifters 212(1)-212(N).

During operation, source generators 202(1)-202(N) generate radiation signals which are modulated by sequences of tones produced by tone generators 204(1)-204(N) respectively. Modulators 206(1)-206(N) modulate the radiation signals with unique tone sequences of N tones which are then combined by coupler 228, amplified by amplifier 208 and transmitted through medium 108 toward target 106.

The transmitted radiation signals may be partially absorbed by the target or medium and reflected back to detector 226. The detected signals are then amplified by amplifier 224 and inputted to multipliers 214(1)-214(N) and 222(1)-222(N) respectively. Since the detected signals may be delayed by transmission travel time (time for the radiation signals to reach target and bounce back to the receiver) the original tone sequences generated by tone generators 204(1)-204(N) may be delayed (by optional delay blocks 210(1)-210(N)) in order to maintain time synchronization with the transmitted signals. The time delayed tone sequences and 90 degree phase shifted (shifted by phase shifters 212(1)-212(N)) versions of the time delayed tone sequences are utilized as reference signals that are multiplied by the received signals by multipliers 214(1)-214(N) and 222(1)-222(N) respectively. The multiplication in each channel produces two product signals, namely the inphase and quadrature components respectively of the demodulated received signal. The levels of the inphase and quadrature components may then be utilized to compute amplitude and/or phase information of the received signal.

FIG. 2a furthermore shows that the inphase and quadrature components of the received signals are low pass filtered by filters 218(1)-218(N) and 220(1)-220(N). Lock-in value calculators 216(1)-216(N) compute the lock-in values for each channel over a lock-in time period. In general, the lock-in value calculator for each channel may be a processor, FPGA, ASIC or hard wired circuitry. In one embodiment, lock-in value calculators 216(1)-216(N) take digital samples of the filtered inphase and quadrature components to perform vector math operations during the lock-in period to compute the lock-in values. In one embodiment the lock-in values are based on amplitudes of the received signals, and in another embodiment the lock-in values may be a based on phase values of the received signals. In general, each channel within the system computes a lock-in value over the lock-in period (including one or more repetitions of the tone sequence) in the general manner described above.

In another embodiment, FIG. 1b shows one-way lock-in system 150 having a separate transmitter and receiver. System 150 includes a transmitter 250 which transmit radiation signals 154(1)-154(N) through medium 108 toward receiver 260. In this embodiment, the radiation signals are detected by receiver 260 remotely located on the other side of medium 108. This configuration provides a one-way system for identifying medium 108 without the need for a reflective target.

Figure 2B:
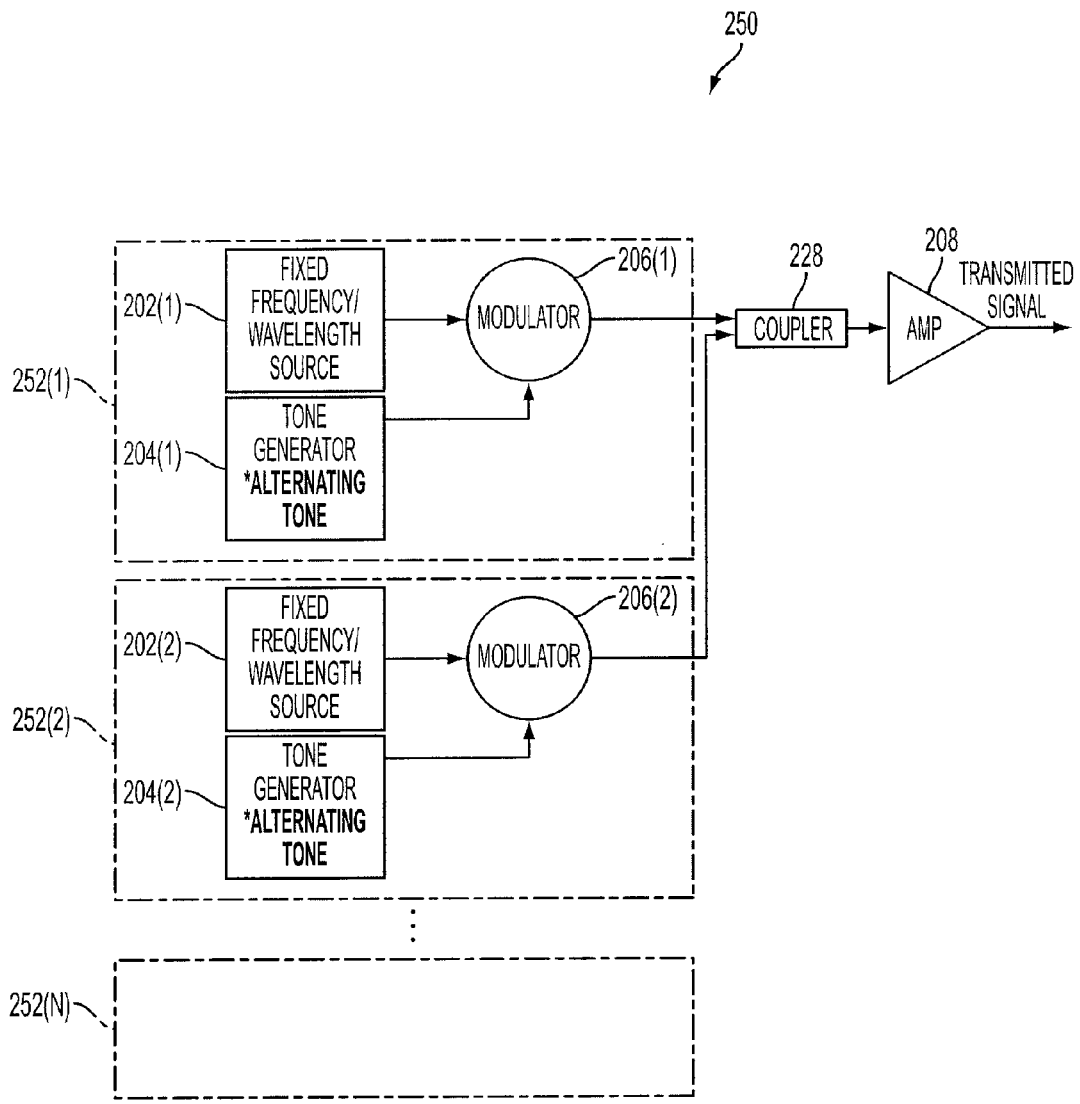
FIG. 2b is a block diagram of a transmitter for the N channels of the one-way tone hopped lock-in system in FIG. 1b, according to an embodiment of the present invention.

Shown in FIG. 2b is an embodiment of transmitter 250 including transmission modules 252(1)-252(N) that may be used for each of the N channels depicted in FIG. 1b. The configuration and operation of the transmission components shown in FIG. 2b are similar to the configuration and operation of the transmission components shown in FIG. 2a with the exclusion of the synchronization components and reception components.

Figure 2C:
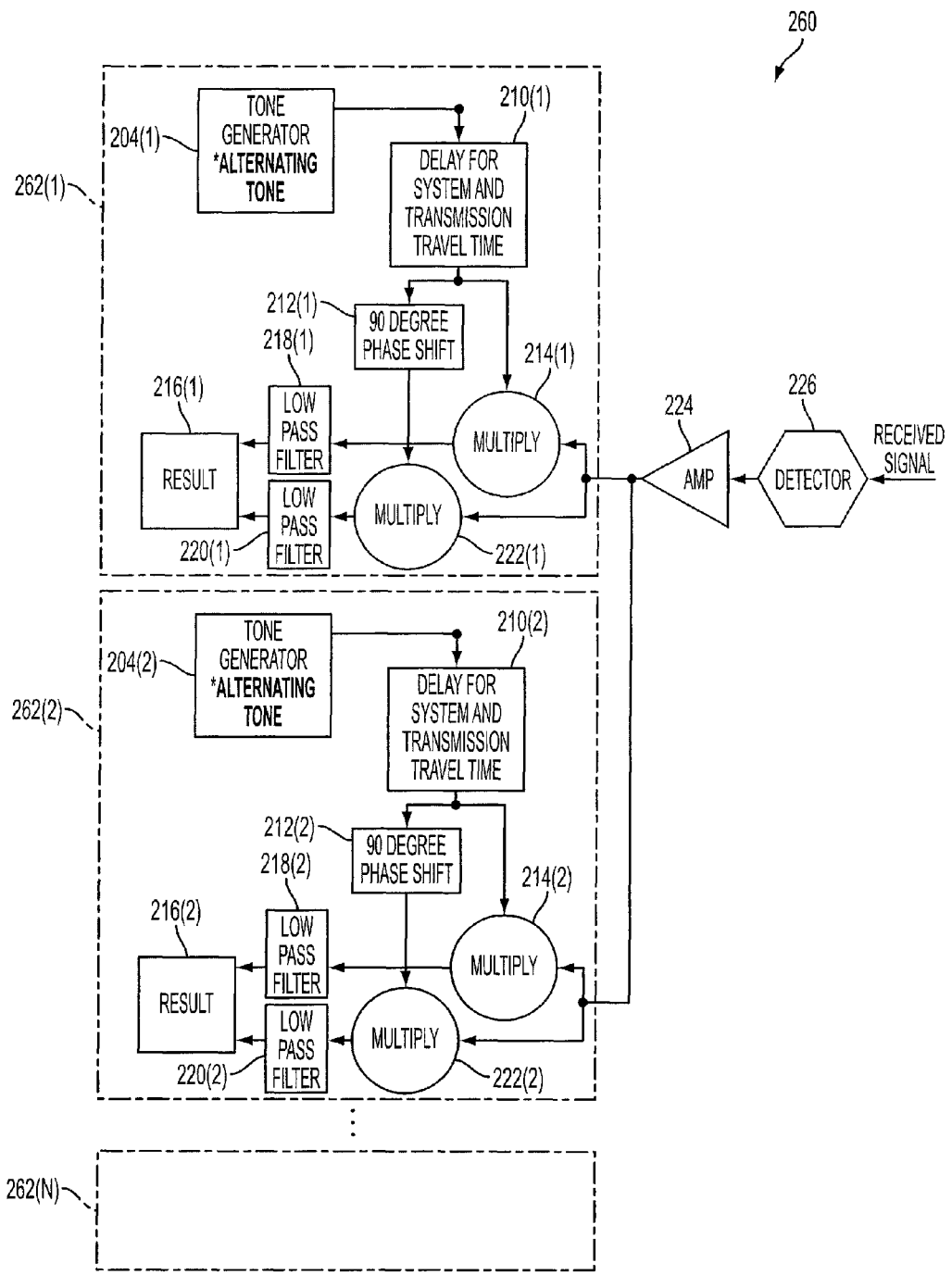
FIG. 2c is a block diagram of a receiver for the N channels of the one-way tone hopped lock-in system in FIG. 1b, according to an embodiment of the present invention.

Similarly, FIG. 2c shows an embodiment of receiver 260 including reception modules 262(1)-262(N) that may be used for each of the N channels depicted in FIG. 1b. The configuration and operation of the reception and synchronization components shown in FIG. 2c are similar to the configuration and operation of the reception and synchronization components shown in FIG. 2a with the exclusion of the transmitter components.

Figure 3A:
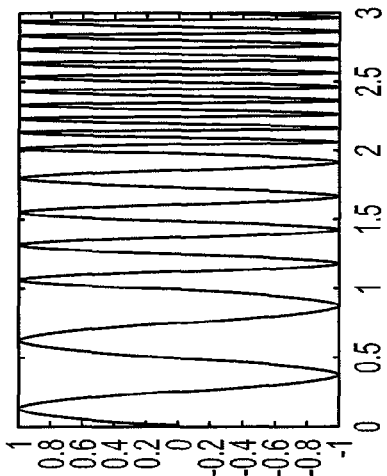
FIG. 3a is a plot of a sequence of three tones for a first channel in a three channel tone hopped system, according to an embodiment of the present invention.
Figure 3B:
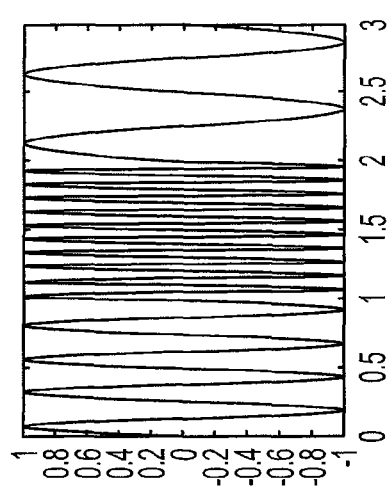
FIG. 3b is a plot of a sequence of three tones for a second channel in a three channel tone hopped system, according to an embodiment of the present zo invention.
Figure 3C:
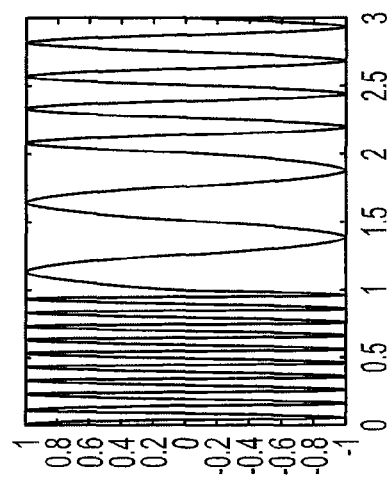
FIG. 3c is a plot of a sequence of three tones for a third channel in a three channel tone hopped system, according to an embodiment of the present invention.

An example of a three channel (N=3) tone sequence that may be utilized in either two-way system 100 or one-way system 150 is shown in FIGS. 3a, 3b and 3c respectively. FIGS. 3a, 3b and 3c correspond to three separate channels having modulating tones sequences (sequences, sequence2 and sequence3) at unique frequencies (From 0-1 sec channel (1)@2 Hz, channel(2)@4 Hz channel(3)@9 Hz), (From 1-2 sec channel(1)@4 Hz, channel(2)@9 Hz, channel(3)@2 Hz) and (From 2-3 sec channel(1)@9 Hz, channel(2)@2 Hz, channel(3)@4 Hz).

In this example, the tone frequency and number of tone cycles per tone in, the sequence are chosen so that phase continuity is maintained at the transition points between the tones. In general, the minimum number of tone cycles for each tone in the sequence may be computed utilizing the following equations:

$$n1=(f1*t)/N$$

$$n2=(f2*t)/N$$

.

.

.

$$nN=(fN*t)/N$$

where:
N=number of channels=number of tones
n=number of tone cycles
t=time for one sequence FIGS. 3a, 3b and 3c show one example of three tone sequences for a three channel system. Lock-in may be performed over a lock-in period of 3 seconds (1 repetition of the tone sequence), or 6 seconds (2 repetitions of the tone sequence), or 9 seconds (3 repetitions of the tone sequence), . . . etc. In general, the radiation signal transmitted by each channel is modulated by a unique sequence of tones and lock-in may be applied over a single repetition of the tone sequence for each channel or an integer number of repetitions of the tone sequence for each channel.

The present invention provides an apparatus for canceling lock-in multipath effects and compensating for differences in the measurement system's static frequency response and frequency response variations due to temperature or other causes.

Although the invention is illustrated and described herein with reference to specific embodiments, the invention is not intended to be limited to the details shown. Rather, various modifications may be made in the details within the scope and range of equivalents of the claims and without departing from the invention. Another embodiment may use swept frequency/wavelength sources rather than fixed frequency/wavelength sources.

What is claimed:
1. A measurement system comprising:
a plurality of channels, each of the channels transmitting a unique wavelength signal;
a tone generator for generating a plurality of tones, each tone having a unique frequency, and for providing a unique sequence of the tones for each respective channel;

a modulator for modulating the unique wavelength signal of each channel with the unique sequence of the tones provided for each respective channel;

a transmitter for transmitting the modulated signals for each channel; and a detector for detecting the modulated signals for each channel;

wherein each channel includes
- a lock-in amplifier that performs lock-in on the detected signal during a lock-in time period, the lock-in time period includes at least one repetition of the unique sequence of the tones for each respective channel,
- an inphase multiplier and quadrature multiplier,
- a 90 degree phase shifter for phase shifting the unique sequence of the tones, and
- the inphase multiplier and quadrature multiplier multiply the detected signal with both the unique sequence of the tones and the 90 degree phase shifted unique sequence of the tones respectively to produce inphase and quadrature components.

2. The system of claim 1 including
a first unique wavelength signal in a first channel modulated with a first unique sequence of the tones;
a second unique wavelength signal in a second channel modulated with a second unique sequence of the tones; and
wherein at any fixed time during transmission of the first and second modulated signals, the tone in the first channel has a frequency different from the frequency of the tone in the second channel.

3. The system of claim 2 wherein
the first and second unique sequences of the tones include a same predetermined number of cycles per tone that are generated during a predetermined time period.

4. The system of claim 1 wherein
the frequency of each of the tones is chosen to provide frequency separation between the channels.

5. The system of claim 1 wherein
an $N^{th}$ modulated signal in an $N^{th}$ channel includes an $N^{th}$ sequence of the tones; and
the $N^{th}$ sequence of the tones in the $N^{th}$ channel is different from any other sequence of the tones in any other channel.

6. The system of claim 1 wherein
the number of transmission channels is equal to the number of the tones.

7. The system of claim 1, each channel including
an inphase filter and quadrature filter for filtering the inphase and quadrature components, and
a lock-in calculator that calculates a lock-in value based on samples of the filtered inphase and quadrature components.

8. The system of claim 1, including
a ratio calculator that calculates ratios between lock-in values of the respective channels, the ratios being compared to benchmark values to identify a medium through which the modulated signals are transmitted.

9. A measurement method comprising the steps of:
providing an optical signal having a unique wavelength to each of a plurality of channels;
generating a plurality of tones, each tone having a unique frequency;
modulating by a modulator the optical signal of each channel with a unique sequence of the tones; and
transmitting the modulated optical signal of each channel toward a receiver,
wherein transmitting includes:
transmitting at least a first optical signal having a first wavelength in a first channel after being modulated with a first sequence of the tones,
transmitting at least a second optical signal having a second wavelength in a second channel after being modulated with a second sequence of the tones, and
the first wavelength is absorbable by the medium and the second wavelength is non-absorbable by the medium; and
receiving by the receiver the modulated optical signal of the first and second channel; and
demodulating the modulated optical signal of the first and second channel by multiplying the first modulated optical signal and the second modulated optical signal by the first sequence of the tones and the second sequence of the tones, respectively.

10. The measurement method of claim 9, further comprising the step of:
calculating lock-in values in a time period including at least one repetition of the sequence of the tones.

* * * * *